(12) United States Patent
Furuya

(10) Patent No.: US 8,587,824 B2
(45) Date of Patent: Nov. 19, 2013

(54) INFORMATION PROCESSING APPARATUS AND METHOD FOR CONTROLLING DISPLAY OF PRINT DRIVER NAMES

(75) Inventor: Tomoyuki Furuya, Ohta-ku (JP)

(73) Assignee: Canon Kabushiki Kaisha, Toyko (JP)

( * ) Notice: Subject to any disclaimer, the term of this patent is extended or adjusted under 35 U.S.C. 154(b) by 0 days.

(21) Appl. No.: 13/345,193

(22) Filed: Jan. 6, 2012

(65) Prior Publication Data
US 2012/0105890 A1    May 3, 2012

Related U.S. Application Data

(63) Continuation of application No. 13/038,249, filed on Mar. 1, 2011, now Pat. No. 8,111,422, which is a continuation of application No. 11/685,926, filed on Mar. 14, 2007, now Pat. No. 7,920,280.

(30) Foreign Application Priority Data

Mar. 17, 2006    (JP) .................................. 2006-075547

(51) Int. Cl.
*G06F 15/00*    (2006.01)
*G06F 3/12*    (2006.01)

(52) U.S. Cl.
USPC .......................................... 358/1.3; 358/1.13

(58) Field of Classification Search
USPC ............ 358/1.1, 1.5, 1.6, 1.8, 1.9, 1.13, 1.14, 358/1.15, 1.18, 449, 498; 347/14, 16, 101; 399/407

See application file for complete search history.

(56) References Cited

U.S. PATENT DOCUMENTS

| | | | |
|---|---|---|---|
| 6,707,568 B1 * | 3/2004 | Yu | 358/1.15 |
| 7,423,769 B2 * | 9/2008 | Yu | 358/1.1 |
| 7,920,280 B2 * | 4/2011 | Furuya | 358/1.13 |
| 2005/0024671 A1 * | 2/2005 | Abe | 358/1.13 |
| 2005/0141013 A1 * | 6/2005 | Kikuchi et al. | 358/1.14 |
| 2006/0072140 A1 * | 4/2006 | Mitani | 358/1.13 |
| 2007/0002349 A1 * | 1/2007 | Hwang et al. | 358/1.13 |

\* cited by examiner

*Primary Examiner* — Gabriel Garcia
(74) *Attorney, Agent, or Firm* — Canon USA, Inc., IP Division

(57) ABSTRACT

An information processing apparatus includes a first type printer driver and a second type printer driver that is different than the first type printer driver, where each driver runs on the information processing apparatus. The information processing apparatus also includes a display control unit that displays an identification of the first type printer driver as a printer driver suited to create print data based on drawing data in response to a first type application outputting the drawing data, and displays an identification of the second type printer driver as a printer driver suited to create print data based on drawing data in response to a second type application different than the first type application outputting the drawing data. The first and second type printer drivers are used for a printing apparatus.

15 Claims, 12 Drawing Sheets

FIG. 8

|  | Win 32 APPLICATION (201) | Win Fx APPLICATION (211) |
|---|---|---|
| GDI PRINTER DRIVER (203) | SUITED | UNSUITED |
| XPS PRINTER DRIVER (213) | UNSUITED | SUITED |

F I G. 9
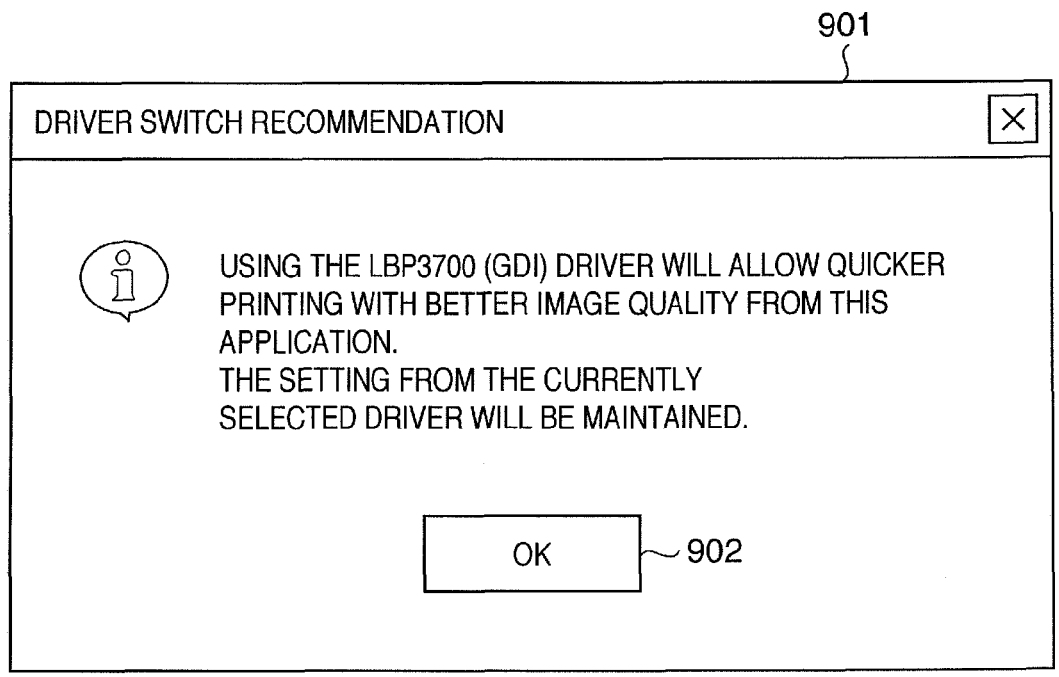

INFORMATION PROCESSING APPARATUS AND METHOD FOR CONTROLLING DISPLAY OF PRINT DRIVER NAMES

The present application is a continuation of U.S. Pat. No. 8,111,422, filed on Mar. 1, 2011, which is a continuation of U.S. Pat. No. 7,920,280, filed on Mar. 14, 2007, which claims priority from Japanese Patent Application No. 2006-075547, filed Mar. 17, 2006, all of which are hereby incorporated by reference herein in their entirety.

BACKGROUND OF THE INVENTION

1. Field of the Invention

The present invention relates to an information processing apparatus and a print setting reflection method pertaining to an information processing apparatus, which may include, but is not limited to, for example, print processing using a plurality of varying graphics engines.

2. Description of the Related Art

It is typical for an operating system to take on a configuration such as that depicted in FIG. 3, in order to print an image or a text on a print apparatus from an application that is being executed on a host computer. An application 101 passes a graphics data to a graphics engine 103 by calling a drawing function provided by the graphics engine, and the graphics data is processed in the graphics engine 103 and passed to a printer driver 104, which generates a print data for the print apparatus, typically in Page Description Language, or PDL. After the print data is stored in a spooler 105, it is sent to a print apparatus 1500.

The graphics engine 103 performs processing of the image data such as converting a resolution of the print data that is created in the application 101, or simulation processing in line with the printer driver's 104 capability. It is thus possible for the application 101 and the printer driver 104 to run independently of one another. The graphics engine 103 is normally provided as a component of an operating system 102.

The graphics engine 103 is not necessarily limited to one engine. It is also possible to have an operating system wherein two or more graphics engines coexist.

For example, WinHEC 2005, a hardware engineering conference, was sponsored in 2005 in Seattle, Wash. by Microsoft. A new Microsoft operating system, with the name of Windows® Vista, was introduced at WinHEC 2005, as having a configuration with two coexisting graphics engines, as depicted in FIG. 1. As of Feb. 28, 2005, refer to Advances in Windows Printing: TWPR05001_WinHEC05.ppt, May 7, 2004, at Microsoft.com®, on the Architecture and Driver Support for Printer Technology for Windows Printing Technologies page.

A conventional Microsoft printing system uses a graphics engine called Graphic Device Interface (GDI), via an application that uses an application programming interface, or API, known as a Win32 API, i.e., a Win32 application. The print data is created from the graphics data, via the printer driver that is called from the GDI, i.e., a GDI printer driver. The print processing route is referred to according to the embodiment as a GDI print path.

In Windows Vista, a new print path, known as an XPS print path, is added to the existing GDI print path. With the XPS print path, a graphics engine known as Windows Presentation Foundation (WPF) is provided by the operating system, via an application that uses an API known as a WinFx API, i.e., a WinFX application. A graphic data in XML Paper Specification (XPF) format is passed by the WPF graphics engine to the printer driver, i.e., an XPS printer driver, which converts the graphic data to the printer data.

The GDI and WPF graphics engines can link together. Such a link facilitates passing the graphics data from a Win32 application to an XPS printer driver, as well as passing the graphics data from a WinFX application to a GDI printer driver.

Because of the link, when a print is performed from the WinFX application using the GDI printer driver, the graphics data is converted in the WPF graphics engine to a graphics data in the XPS format, which in turn is converted to a graphics data in an EMF format. After the converted graphics data is stored in an EMF spool file, a conversion to the print data is performed in the GDI driver.

When a print is performed from the Win32 application using the XPS printer driver, the graphics data is converted in the GDI graphics engine to a graphics data in the EMF format, which in turn is converted to a graphics data in the XPS format. After the converted graphics data is stored in an XPL spool file, a conversion to the print data is performed in the XPS driver.

Thus, four print paths are offered within Windows Vista. Offering either a GDI printer driver or an XPS printer driver thus allows support for print processing from both a Win32 application and a WinFx application.

Differences between the XPS format and the EMF format, however, lead to issues with graphics data format conversion in areas that include, but are not limited to, print quality, feature set, or print speed.

For example, a graphics data that contains a logical operation such as a raster operation process (ROP) computation, which is supported in the EMF format, would not be supported in the XPS format. Thus, under a specification established by Microsoft, converting the graphics data that contains the logical computation with a GDI-XPS conversion module that converts from the EMF format to the XPS format runs a risk of having the logical computation information being stripped out. It is possible that, when the graphics data from which the logical computation information has been removed is passed to the XPS printer driver, it may not be possible for an output result intended in the Win32 application to be created by the XPS printer driver.

Conversely, a sophisticated graphics data that is supported in the XPS format is not supported in the EMF format. Consequently, when converting such a graphics data from the XPS format to the EMF format with an XPS-GDI conversion module, a local bitmapping, known as flattering, is performed. In such a circumstance, the conversion of the graphics data into a bitmap data means that no determination can be made of original object properties on the part of the GDI printer driver, which, thus, cannot create an output result that corresponds to the object properties. Data format conversion degrades outputted image quality. For example, when performing an n page print with the printer driver, the bitmapped data is compressed and positioned, and thus, image quality is lower than when drawing a graphics object at a reduced size.

For example, electronic signature information that is supported in the XPS format is not supported in the EMF format. A process of directly giving information from an application to the GDI printer driver, which is supported in the EMF format, is not supported in the XPS format. Thus, when converting from the XPS format to the EMF format, or conversely, in the opposite direction, if an instruction is included in the pre-conversion format graphic data that uses a feature that is not supported in the post-conversion format, the feature will not be carried out. When a data format conversion process is performed, a feature that cannot be fulfilled may be present within the graphics data of the respective formats.

An occurrence of a process, including but not limited to GDI-XPS conversion, or XPS-GDI conversion, also gives rise to a process overhead, which runs a risk of print processing speed being slower than a path that does not require a conversion.

Hence, when a data format conversion is performed, a problem occurs also with any of a quality aspect, a feature set aspect, or a speed aspect. Accordingly, it is desirable to avoid a print path wherein the data format conversion is performed.

At the same time, a selection of a printer driver to use is left to a user, even when the XPS printer driver and the GDI printer driver are installed in a computer for a common print apparatus. The graphics engine in Windows Vista does not automatically perform a selection of a path that does not require a data format conversion. Many typical users are not conscious of whether an application is a Win32 application or a WinFX application, nor are they aware that there are four print paths. Thus, once a user selects a printer driver as a default printer driver, the selected printer driver will be used regardless of the type of application. In such manner, it has been difficult, if not impossible, to avoid a data format conversion in the print path, of the GDI-XPS conversion or the XPS-GDI conversion.

SUMMARY OF THE INVENTION

According to an aspect of the present invention, an information processing apparatus and a method for an information processing apparatus are provided, such that a print setting once inputted for a printer driver may be applied to another printer driver, even if the printer driver that is used is changed to another printer driver corresponding to a graphics engine that an application uses.

According to another aspect of the present invention, an embodiment is directed to an information processing apparatus that includes a first graphics processing unit for converting graphics data from a first type application to first print data capable of being processed by a first type printer driver, and a second graphics processing unit for converting graphics data from a second type application to second print data capable of being processed by a second type printer driver. The apparatus comprises: a determination unit configured to determine whether a combination of an application and a first printer driver corresponds to a first combination of the first type application and the first type printer driver, or a second combination of the second type application and the second type printer driver; a user interface unit configured to enable selection of a second printer driver, if it is determined that the combination of the application and the first printer driver does not correspond to the first combination and the second combination; and a print setting value handling unit configured to use a print setting value that is set for the first printer driver as a print setting for the second printer driver, if the second printer driver is currently selected. With this embodiment, it may be possible to perform a print process via a printer driver that directly corresponds to a graphics engine that an application uses in a print processing, without having to pre-select a printer driver as a printer driver to use. When changing a printer driver to be used, it is possible to reflect a print setting value for a pre-change printer driver as a print setting value for a post-change printer driver. Consequently, a user will be able to obtain a high-quality output that is created by the application program promptly and without undue difficulty.

Further features of the present invention will become apparent from the following description of exemplary embodiments (with reference to the attached drawings).

BRIEF DESCRIPTION OF THE DRAWINGS

FIG. 8 depicts a determination condition that is performed in an application driver determination unit within the user interface driver according to an embodiment.

FIG. 9 depicts an example of a driver switch dialogue box that is displayed by a dialogue display unit within the user interface driver according to an embodiment.

DESCRIPTION OF THE EMBODIMENTS

First Embodiment

<Computer Configuration>

Following is a description of an embodiment of a print control apparatus according to the present invention. The print control apparatus is fulfilled by a computer, i.e., an information processing apparatus. An example of a configuration of the computer's software is depicted. A configuration of the computer's hardware is constituted of a CPU, a memory, a user interface, which may include, but is not limited to, a keyboard or a display, and a file storage apparatus, similar to a typical general-use computer.

Figure 1:
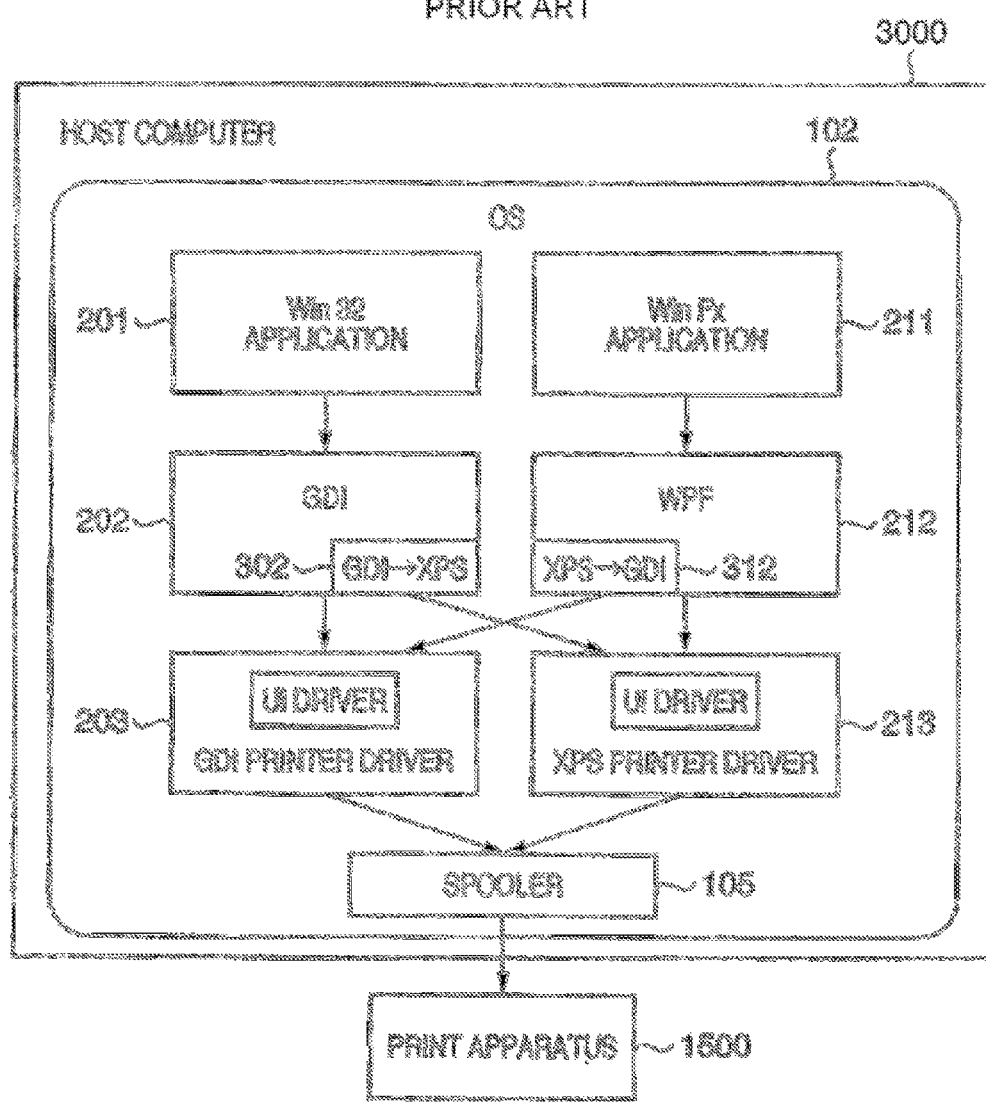
FIG. 1 depicts a component of a print path and a print process in Windows Vista as an example of a coexistence of a plurality of graphics engines.

FIG. 1 depicts a component of a print process flow and a print process in Windows Vista as an example of a coexistence of a plurality of graphics engines. In Windows Vista, an application is classified into two types, a Win32 application 201, which is a first type application, and a WinFX application 211, which is a second type application. Two graphics engines are present in an operating system 102, a GDI 202, which is a first graphics processing unit, and a WPF 212, which is a second graphics processing unit. In the present circumstance, the Win32 application 201 passes a GDI function that is a first graphics data to a GDI 202, and the WinFX application 211 passes a data in a WPF API format that is a second graphics data to a WPF 212.

A printer driver is classified into two types, a GDI printer driver 203, which is a first type printer driver, and an XPS printer driver 213, which is a second type printer driver. The GDI printer driver 203 receives the graphics data from the GDI 202, and converts it into a print data to be transmitted to a print apparatus 1500. The XPS printer driver 213 receives the graphics data from the WPF 212, and converts it into a print data to be transmitted to the print apparatus 1500. The printing data that is created by the printer driver is transmitted to the print apparatus 1500 via a spooler 105.

In the present circumstance, a print path that creates a print data in the GDI printer driver 203, from the Win32 application 201 via the GDI 202, is referred to as a GDI print path. A print path that creates a print data in the XPS printer driver 213, from the WinFX application 211 via the WPF 212, is referred to as an XPS print path. In the present circumstance, the GDI print path and the XPS print path are collectively referred to as a straight print path. Aside from the GDI print path and the XPS print path, however, there exist a print path that creates a print data in the XPS printer driver 213, from the Win32 application 201 via the GDI 202, and a print path that creates a print data in the GDI printer driver 203, from the WinFX application 211 via the GDI 212. The paths are fulfilled by converting a data format via a GDI->XPS conversion module 302 and an XPS->GDI conversion module 312 (see FIG. 2). In the present circumstance, the print paths wherein the respective graphics engines convert into the respective data formats are collectively referred to as a cross-print path.

Figure 2:
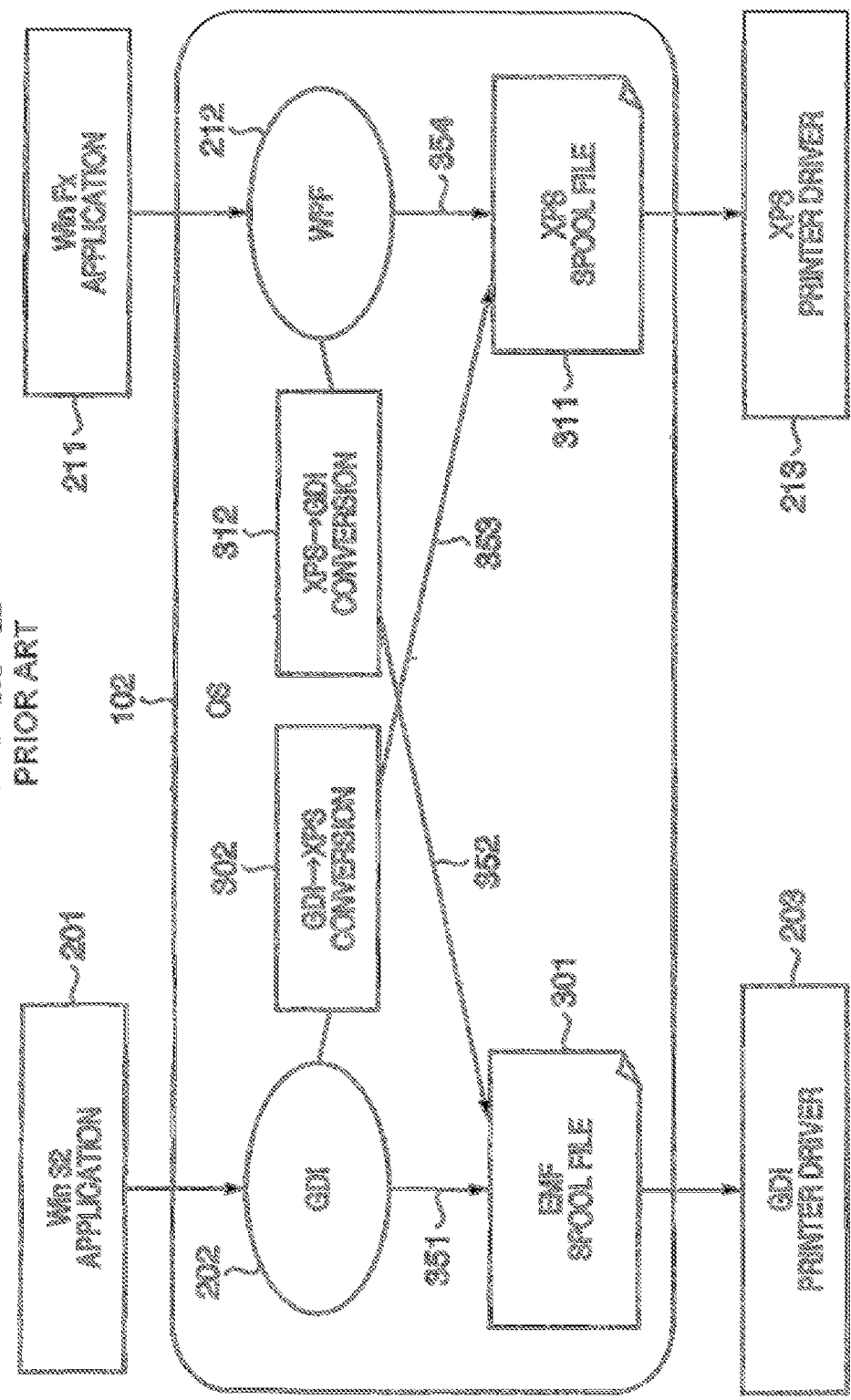
FIG. 2 depicts an arrangement of a coexistence of two graphics engines in Windows Vista.
Figure 3:
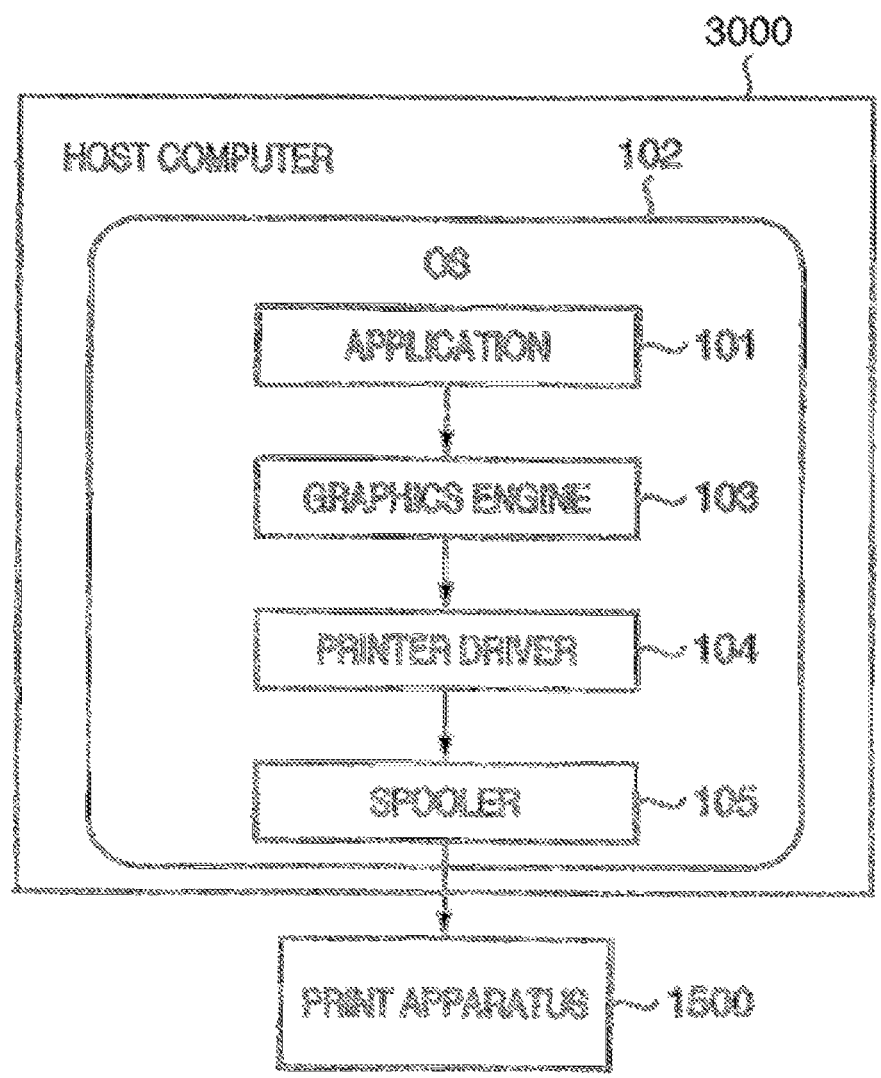
FIG. 3 depicts a component of a typical print path and a typical print process.

Following is a description of a print path, with reference to FIG. 2, which depicts an arrangement of a coexistence of two graphics engines in Windows Vista, wherein four types of print paths are present, a print path 351, a print path 352, a print path 353, and a print path 354.

The print path 351 depicts the GDI print path. The graphics data that is passed from the Win32 application 201 is stored in Enhanced Metafile (EMF) format, in an EMF spool file, in the GDI 202, after which a conversion to the print data is performed in the GDI printer driver 203.

The print path 354 depicts the XPS print path that is added to Windows Vista. The graphics data that is passed from the WinFX application 211 is stored in an XPS spool file 311, in the WPF 212, after which a conversion to the print data is performed in the XPS printer driver 213.

The print path 352 depicts the print path when printing a data from the WinFX application 211 in the GDI printer driver 203. The graphics data that is passed from the WinFX application 211 is converted by the XPS->GDI conversion module 312 via the WPF 212 into a graphics data in the EMF format. After the converted graphics data is stored in the EMF spool file 301, a conversion to the print data is performed in the GDI driver 203.

The print path 353 depicts the print path when printing from the Win32 application 201 in the XPS printer driver 213. The graphics data that is passed from the Win32 application 201 is converted by the GDI->XPS conversion module 302 into a graphics data in the XPS format. After the converted graphics data is stored in the XPS spool file 311, it is changed to the print data in the XPS printer driver 213.

Figure 4:
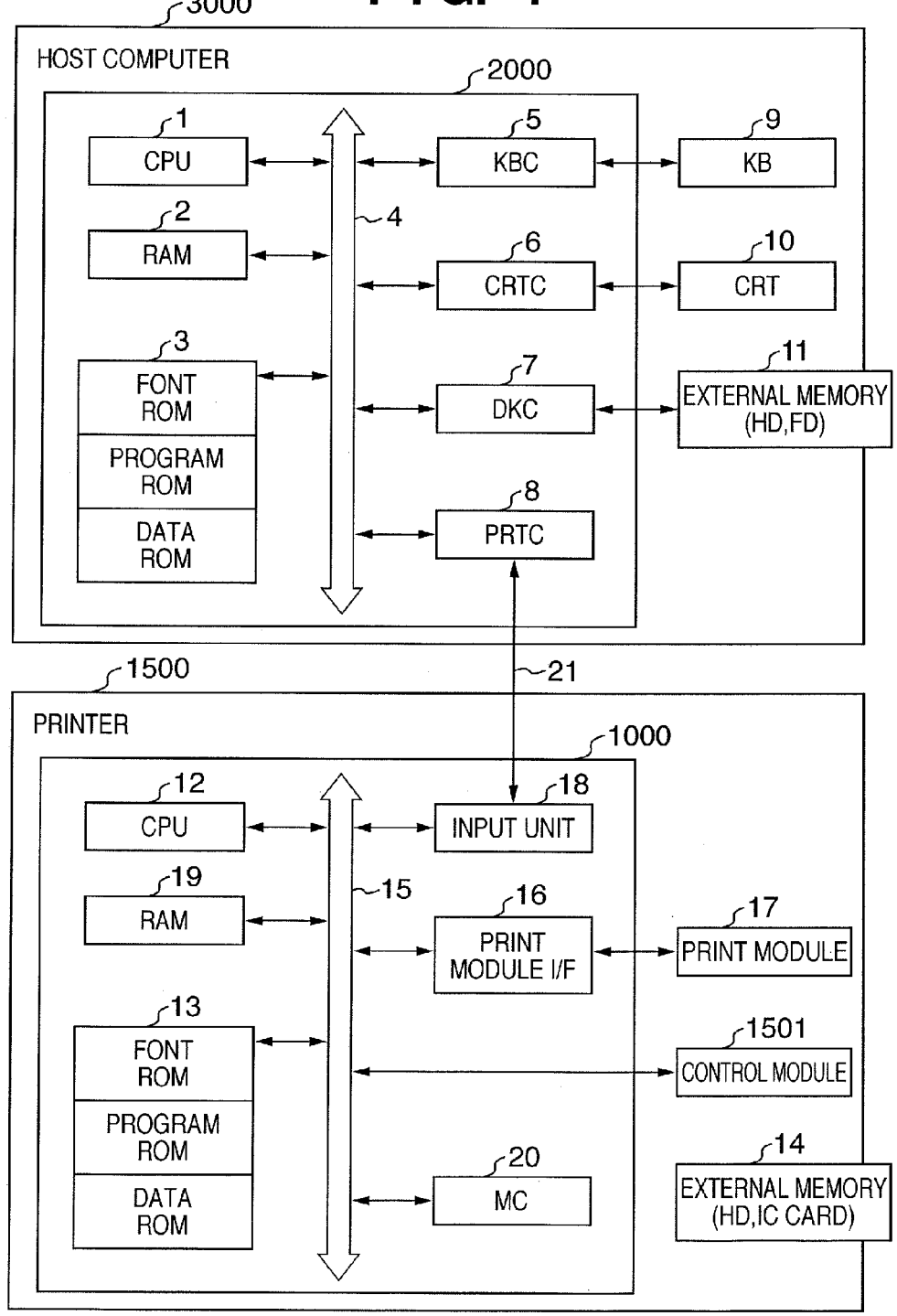
FIG. 4 is a block diagram depicting an example of an information processing system configuration to which an information processing apparatus and a control method and printer driver thereto are applied, according to an embodiment.

FIG. 4 is a block diagram describing a printer control system configuration containing a computer, according to an embodiment. Unless otherwise specified, a system may be applied to an embodiment of the present invention if a function of an embodiment of the present invention is executed, regardless of whether it be comprised of a single device or a plurality of devices, or even if it is a system constituted by being connected via a LAN, WAN, or other network, and a process is performed thereby.

In FIG. 4, a host computer 3000 comprises a CPU 1, which executes a processing of a document of mixed content, which may include, but is not limited to, a diagram, a graphical image, text, or a chart, which, in turn, may include, but is not limited to, a spreadsheet, in accordance with a document processing program or other instruction that is stored in either a ROM 3 (program ROM) or an external memory 11, and the CPU 1 universally controls all devices that are connected via a system bus 4.

Either the ROM 3 (e.g., program ROM) or the external memory 11 stores an operating system program (OS) that is a control program of the CPU 1 or other program code. Either the ROM 3 (font ROM) or the external memory 11 stores font data or other codes that are used in the document processing. Either the ROM 3 (data ROM) or the external memory 11 stores various types of data that are used in the document processing or other processing.

A RAM 2 functions as a main memory, a work area, or other area of the CPU 1. A keyboard controller 5 controls a key input from a keyboard 9 or a pointing device (not shown). A CRT controller 6 controls a display of a CRT display (referred to herein as "CRT" or "display") 10. A disk controller 7 controls access to a hard drive, a floppy disk drive, or other external memory 11, whereupon may be stored, among other things, a boot program, various types of applications, the font data, a user file, an edit file, or a program that generates a printer control command. The printer drivers pertaining to embodiments of the present invention are also stored in the external memory 11.

A printer controller 8 is connected to the printer 1500 via a prescribed bi-directional interface 21, and executes a communications control processing with the printer 1500. The CPU 1 executes, for example, an outline font generation, or raster sizing, process on a display information RAM that is configured in the RAM 2, allowing WYSIWYG on the display 10.

The CPU 1 opens a variety of windows that are registered, in accordance with a command that is directed by a mouse cursor or other manner on the display 10, and executes a variety of data processing. When a user requests a print operation, a window pertaining to a print setting opens, allowing a setting of a print processing method for a print driver, including a printer setting or a selection of a print mode.

In the printer 1500, a printer CPU 12 outputs an image signal as an output information to a printer engine (print module) 17 that is connected to a system bus 15 via a print module interface (I/F) 16, in accordance with either a control program or other instruction that is stored in a ROM 13 (program ROM) or a control program or other instruction that is stored in an external memory 14.

The ROM 13 (program ROM) stores a control program or other instruction of the CPU 12. The ROM 13 (font ROM) stores a font data or other data that is used when generating the output information, and the ROM 13 (data ROM) stores information that is used on the host computer or other data in the event the printer 1500 does not have an external memory 14 (e.g., a hard drive).

The CPU 12 of the printer 1500 is capable of communication with the host computer 3000 via an input unit 18, thus constituting capability for communicating with the host computer 3000, including but not limited to information internal to the printer. A RAM 19 functions as a main memory, a work area, or other area of the CPU 12. In an embodiment, the RAM 19 may have its capacity expanded via an optional RAM that is connected to an expansion port (not shown). The RAM 19 is used for, including but not limited to, an output information development region, an environment data storage region, or an NVRAM. Access to the external memory 14, which may include but is not limited to the hard drive or an IC card, is controlled by a memory controller 20.

The external memory 14 is optionally connected, and stores information which may include, but is not limited to, font data, an emulation program, or form data. Upon an operation panel (control module) 1501 are mounted a switch, an LED display module, or other device for control. The external memory is not limited to one module, rather, it comprises at least one module, and may be comprised of more than one module, and may be constituted such that a plurality of external memory, within which are stored an optional font card, in addition to an internally loaded font, or a program that interprets a printer control language that varies according to language. An NVRAM (not shown) may also be possessed, which stores a printer mode setting information from the operation panel 1501.

<Detailed Driver Configuration>

Figure 5:
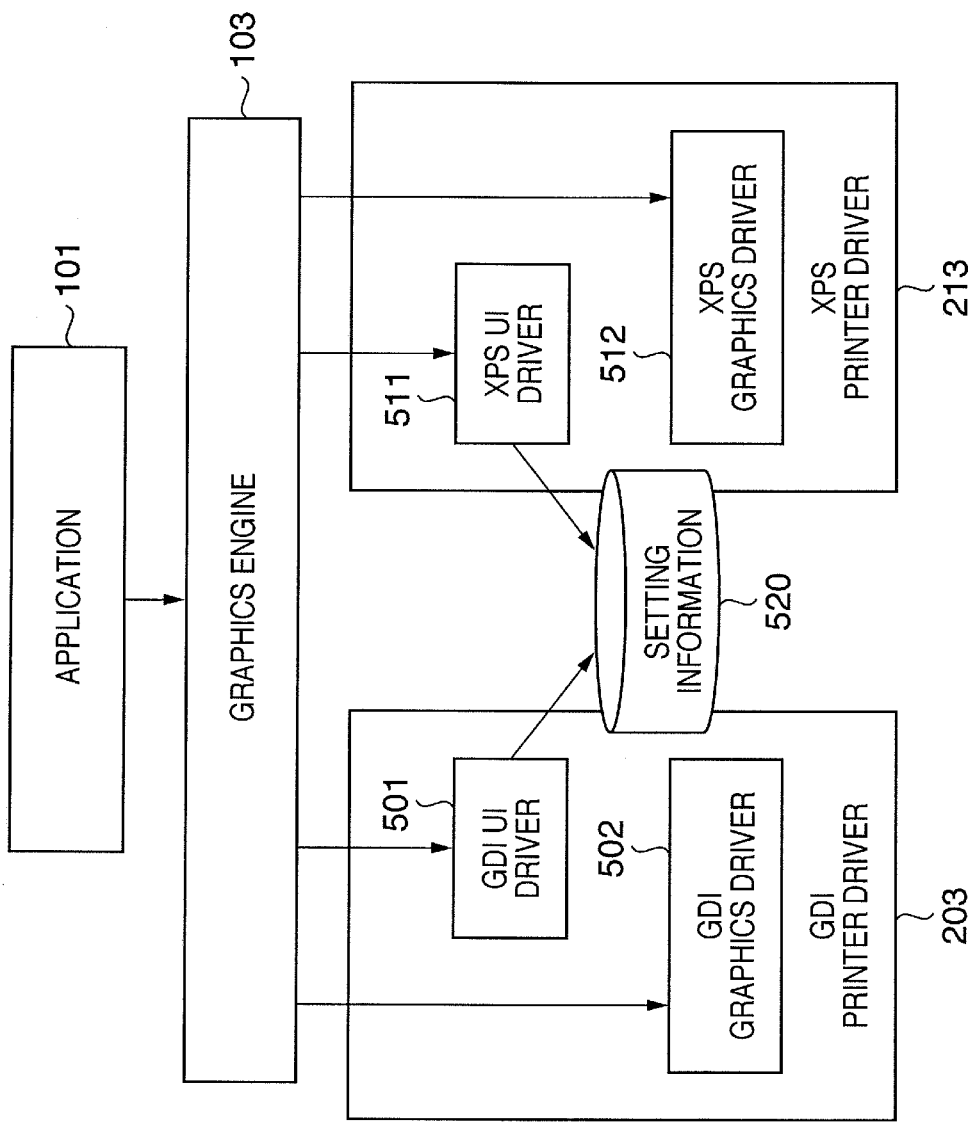
FIG. 5 depicts a configuration of a GDI printer driver and an XPS printer driver according to an embodiment.

FIG. 5 depicts a configuration of a GDI printer driver and an XPS printer driver according to an embodiment. The depiction in FIG. 5 omits a disclosure of an application and a graphics engine, showing them as if they were all one thing. As depicted in FIG. 1, graphics data of respective supported formats is passed from the graphics engine to the printer driver. The GDI printer driver 203 and the XPS printer driver 213 are both installed in the operating system 102 for the print apparatus 1500, according to the embodiment. It is presumed that the GDI printer driver 203 and the XPS printer driver 213 have the same printer as the output destination.

The GDI printer driver 203 is constituted of a GDI user interface driver 501 and a GDI graphics driver 502. The GDI user interface driver 501 stores a printer driver user interface display or print setting information that is inputted by a user in a registry. The GDI graphics driver 502 receives the corresponding graphics data, a Device Driver Interface, or DDI, function, from the graphics engine 103, and creates printer data from the graphics data, in accordance with the print setting information that is stored in the GDI user interface driver 501.

The XPS printer driver 213 is constituted of an XPS user interface driver 511 and an XPS graphics driver 512. The XPS user interface driver 511 stores a printer driver user interface display or print setting information that is inputted by a user in a registry. The XPS graphics driver 512 receives the corresponding graphics data from the graphics engine 103, and creates printer data from the graphics data, in accordance with the print setting information that is stored in the XPS user interface driver 511.

In the present circumstance, it is possible for the GDI user interface driver 501 and the XPS user interface driver 511 to store the print setting information as a setting information 520, in a shared setting information area other than the registry in which the respective printer drivers store their print setting information. In concrete terms, both the GDI user interface driver 501 and the XPS user interface driver 511 are capable of storing the setting information 520 in the setting information storage area, and of reflecting the print setting that is stored in either the registry or the setting information 520 in the user interface configuration screen. Each respective user interface driver is to read or save the print setting information in a designated format known as DEVMODE. The print setting information that is specific to the printer driver contains information for designating, for example, what may include, but are not limited to, an n in 1 that creates a reduced layout of one page of data in one sheet of paper, a printer paper orientation, a page sequence, or a printer paper tray to be used.

Whereas FIG. 5 describes the GDI user interface driver 501 and the XPS user interface driver 511 as differing components, it would also be permissible to use a single shared user interface driver that comprises a feature set of both user interface drivers. In such instance, the GDI printer driver 203 comprises the shared user interface driver and the GDI graphics driver 502, and the XPS printer driver 213 comprises the shared user interface driver and the XPS graphics driver 512.

Figure 6:
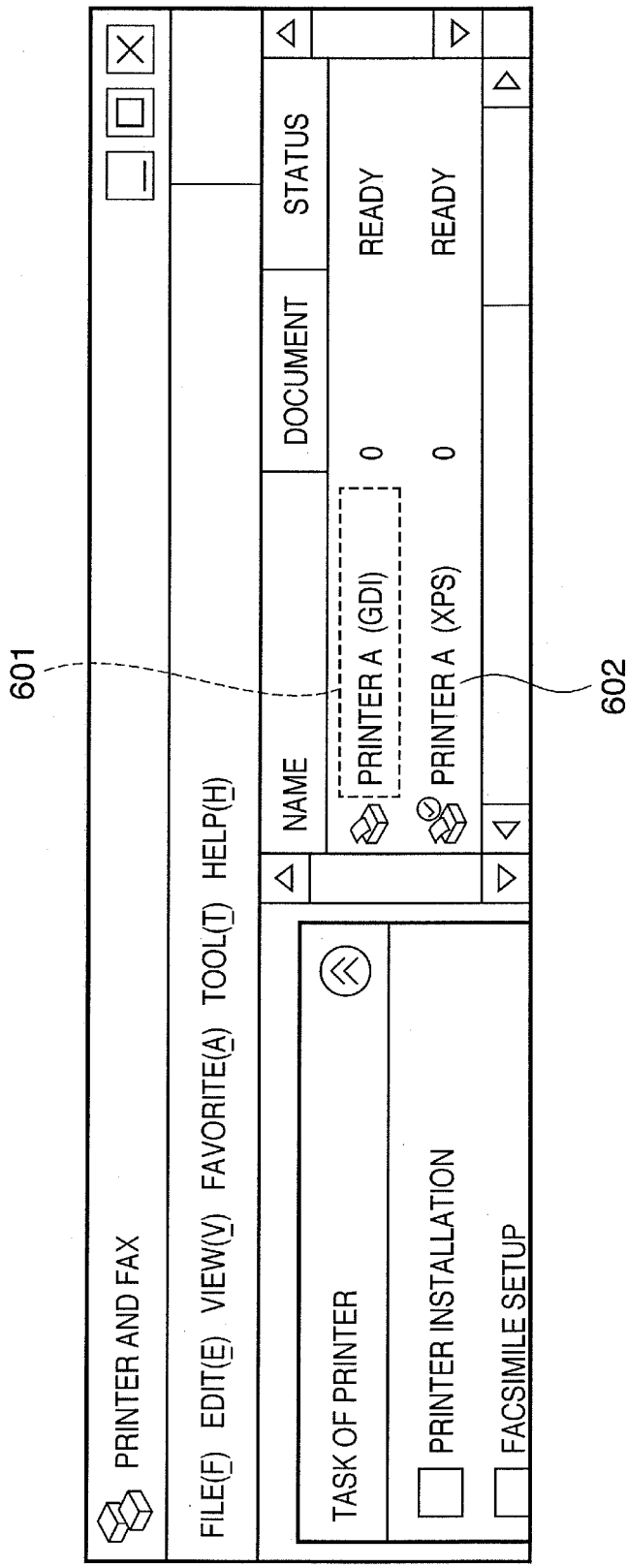
FIG. 6 depicts an example of a display screen illustrating a printer status under a circumstance wherein the GDI printer driver and the XPS printer driver are both installed according to an embodiment.

FIG. 6 is an example of window depicting a printer status under a circumstance wherein the GDI printer driver and the XPS printer driver are both installed according to an embodiment. As depicted in FIG. 6, the GDI printer driver 203 is registered as a printer A (GDI) 601 vis-à-vis a single print apparatus, which is designated as the printer A, for example. At the same time, the XPS printer driver 213 is registered as a printer A (XPS) 602 vis-à-vis the same printer A. Thus, two printer drivers, known as the GDI printer driver 203 and the XPS printer driver 213, coexist vis-à-vis a single print apparatus. It is possible to select a default printer driver within the Microsoft Windows operating system. Within the printer driver that is selected as the default is stored information that specifies that the printer driver is selected as the default, and the information may be accessed by the operating system. Typically, when performing a print from an application, a print setting user interface is displayed within the application. A user may select a printer driver within the application's user interface. If no particular selection is made, the default printer driver is selected, and a print operation is performed using the default printer driver. In FIG. 6, the printer A (XPS) 602 is selected as the default printer driver.

<User Interface Driver Configuration and Operation>

Figure 7:
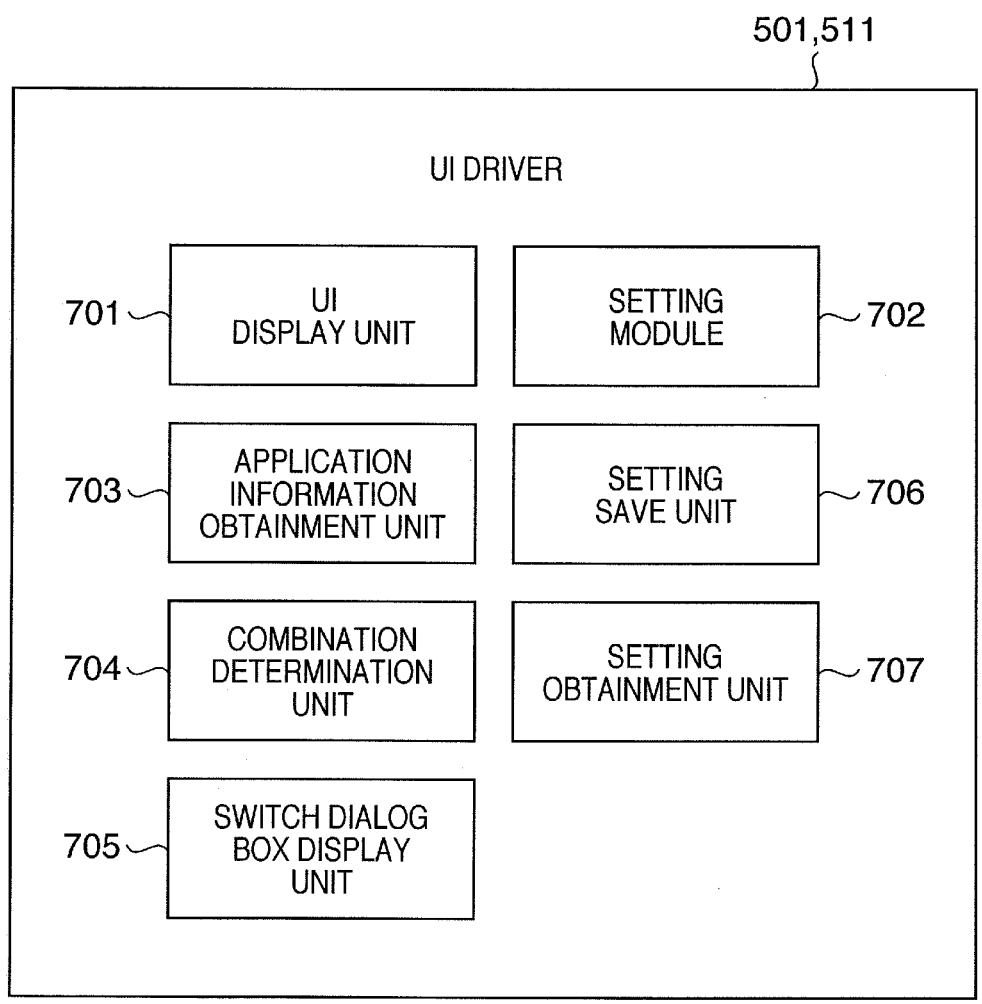
FIG. 7 depicts a user interface driver configuration according to an embodiment.

FIG. 7 depicts a user interface driver configuration according to an embodiment, illustrating the features of an embodiment of the present invention. The user interface driver illustrated in FIG. 7 corresponds to either the GDI user interface driver 501, the XPS user interface driver 511, or the shared user interface driver. The GDI graphics driver 502 and the XPS graphics driver 512 do not perform a particular process, instead operating similar to a typical graphics driver, according to an embodiment. A process that is performed in the GDI user interface driver 501 and the XPS user interface driver 511, as well as a process module stored therein, characteristically depict an embodiment as pertains to the present invention. It is also possible to make the GDI user interface driver 501 and the XPS user interface driver 511 into a shared user interface driver. In such instance, the shared user interface driver possesses a configuration that is characteristic, and performs a process that is characteristic, of features of the present invention. The GDI user interface driver 501, the XPS user interface driver 511, and the shared user interface driver have the feature set in question in common, and will be collectively designated and described as the user interface driver.

When the user interface driver receives a user interface display instruction from the application 201 and 211 via the graphics engine 202 and 212, it obtains the name of the application 101, from an application information obtainment module 703, that calls the user interface driver, according to an embodiment. According to an embodiment, information is obtained as to whether the application is the Win32 application 201 or the WinFX application 211, that is, application type information. By using a GetModuleFileName or other function that is provided by the Win32 API, it is possible to obtain a process name that calls the user interface driver, i.e., an executable file name, according to an embodiment. It is possible to determine whether the application that calls the user interface driver is the Win32 application 201 or the WinFX application 211, as follows. A Dynamic Link Library (DLL), which the executable file imports, is obtained from a header portion that is maintained by the executable file whose name is obtained by the function. A determination is made as to whether or not a module that is specific to a WinFX application is present within the imported DLL. For example, a prior list and storage of a name of a module that is specific to WinFX is made, the module name that is obtained is searched from the list, and it is possible to determine that the module is specific to WinFX if the module is found to be on the list.

While a determination is thus made as to whether the application is the Win32 application 201 or the WinFX application 211, it is further possible to acquire, for example, the application type information, using an API that supplies the application type, if the operating system offers the API. It may instead be possible to link a process name, i.e., the executable file name, within the user interface driver, and adopt such a method as saving an application table that stores the type information that shows whether the application is the Win32 application or the WinFX application. It is desirable that the method be capable of displaying a maintenance user interface for maintaining the application table, and of updating the application table by way of input from a user. By using the GetModuleFileName or other function, the user interface driver obtains the process name that calls the user interface driver, and searches the application table with the process name. If a match is found, the application name that has been assigned to the process name is the name of the application that calls the user interface driver. The type of the application that has been assigned to the process name is the type of the application that calls the user interface driver.

A determination is made by a combination determination unit 704 as to whether or not the application and the user interface driver that the application calls are suitable for one another. A criterion for the determination is depicted in FIG. 8. Suitability refers to conformity between the graphics engine that the application uses and the printer driver. That is to say, it is unnecessary to convert the format of the graphics data, for example, EMF-XPS, that is outputted by the graphics engine. The graphics engine that the application uses is determined in accordance with the application type. Accordingly, knowing the application type information and the printer driver that is selected within the application allows determining suitability. The application type may be obtained via the foregoing operations. The selected printer driver may be specified by querying the selection information, if the selection information is saved on the computer. If the information on the printer driver being used, which may include, but is not limited to, an identifier, may also be passed from the application program that performs a print to the graphics engine and queried in the user interface driver, the information may also be queried. If the printer driver identifier may be queried, it is possible to determine whether the printer driver is the XPS printer driver or the GDI printer driver, that is to say, the printer driver type. For example, it is possible to create and save a table that associates the printer driver name, or identifier, with the type information, and determine the printer driver type by querying the table. That is to say, the printer driver identifier shows the type of the data format being handled and the printer model. Suitability also expresses a union between an application and a printer driver of a common type. A determination of whether or not the application and the printer driver are of a common type must also be performed on a graphics engine in order to determine the necessity of data format conversion, and it will also be possible to adopt the same determination criteria therefor.

If it is determined in the combination determination unit 704 that the combination of the application and the printer driver is not a suitable one, a print setting step is offered to a user via a setting unit 702. That is, a user interface unit 701 displays a print setting screen. A user interface configuration memory unit 706 stores a configuration value that a user inputs in the print configuration screen, i.e., a print setting information, linked with the identifier of the selected printer driver and together with the name of the application, or the name of the executable file, in a setting information storage area, as the setting information 520. The setting information storage area may be an area that is not erased even when a print setting process is finished, including but not limited to a hard drive or a registry, at a different address from the foregoing registry. It is necessary, however, that the setting information storage area be addressable by both the GDI user interface driver 501 and the XPS user interface driver 511. The printer driver identifier that is linked and saved with the print setting information is the printer driver identifier that is unsuited to the cross print path in the present example. If the unsuited printer driver is selected, however, it is permissible to relate the printer driver to a common printer, and link and save the identifier of the printer driver of a different type with the print setting information. In such circumstance, the printer driver of the different type forms the straight path with the graphics engine that is associated with the application.

After a save of the print setting received from the user via the user interface configuration unit 702 and the print setting received from the user interface configuration memory unit 706 is performed, a switching dialog display unit 705 displays a dialog box; see FIG. 9 for details. The dialog box 901 contains a specified sequence of text and a button 902 that calls for a confirmation. The window is closed by the user pressing the button 902. Selecting a new suitable printer driver from the presently selected unsuitable printer driver, also known as switching, is performed by the user, via the application print instruction user interface.

If it is determined in the combination determination unit 704 that the combination of the application and the printer driver is a suitable one, a setting obtainment unit 707 obtains the setting information 520. The setting obtainment unit 707 determines whether or not the application name, or executable file name, that is obtained in the application information obtainment module 703 matches the application name that is contained within the obtained setting information 520, and which is linked to the print setting information and saved. If a plurality of the setting information is saved, each set of the setting information is searched, and a search is conducted as for a possible match with the application name that is obtained in the application information obtainment module 703. An additional search condition in the search is the printer driver identifier that is linked to the print setting information. In the present example, if the combination of the application and the printer driver is unsuitable, the identifier of the unsuitable printer driver is linked to the print setting information and saved. In such circumstance, the search condition is a correspondence with the currently selected printer driver and the shared printer, and that the identifier of the printer driver that differs in type is contained within the setting information. That is, the search condition is that the identifier of the printer driver is included whose type forms a cross path for the type of application for which the newly selected printer driver forms a straight path. The setting information that satisfies the search condition and contains the application name that is obtained in the application information obtainment module 703 is the object of the search.

Distinct from the present example is a conceivable case wherein the identifier of the suitable printer driver is linked to the print setting information and saved, if the combination of the application and the printer driver is unsuitable. In such circumstance, the search condition is that the printer driver identifier that matches the currently selected printer driver identifier is contained within the setting information.

If the printer driver identifier search condition is satisfied, and is saved in the setting information together with the application name that is obtained in the application information obtainment module 703, the print setting information that is linked to the printer driver identifier is the targeted print setting information. If the targeted print setting information is found, and if there is a request from the application print instruction user interface to display the user interface driver setting screen, the user interface unit 701 displays the setting screen on the display 10 that reflects the print setting information. The setting unit 702 receives an input of a setting item on the setting screen. The user may also examine the setting screen and change the print setting information. Thus, a print setting device is offered via the setting unit 702. If the user saves either the displayed setting information or the changed setting information and inputs the print instruction, the selected printer driver uses the saved print setting information to convert the graphics data into the print data, and transmits the print data to the printer.

Even if the application performs a print request without performing the user interface driver call, the graphics driver, i.e., the GDI graphics driver or the XPS graphics driver, converts the graphics data into the print data, and transmits the print data to the printer, according to the print setting information that is contained within the setting information, if the setting information is saved that contains the application name that is obtained in the application information obtainment module 703.

If the application name that matches the name of the application that calls the user interface driver is not found within the setting information, the setting obtainment unit 707 duplicates the preset default setting information in the setting information 520. The default setting information is installed together with the printer driver, when the printer driver is installed. It may also be changed after installation.

By the process of the user interface driver, the print setting information that the user configures via the user interface driver of the printer driver that forms the cross print path is linked with the printer driver identifier and the application name, and saved. If the printer driver that forms the cross print path is selected, it is possible to alert the user of the use of the printer driver that makes the straight print path. It is possible to continue using the print setting information that is linked with the printer driver identifier and the application name, and saved, even if the printer driver that forms the straight print path is subsequently changed by the user. Consequently, it is possible to reflect the print setting that is performed in the pre-switch printer driver user interface driver in the print result from the post-switch printer driver.

FIG. 8 depicts an example of a determination condition that is performed in a combination determination unit within the user interface driver according to an embodiment. A criterion table in FIG. 8 determines that selecting the GDI printer driver 203 when printing from the Win32 application 201 is suitable. Hence, the relevant field is marked as "Suitable," because printing with the Win32 application 201 uses the GDI graphics engine 202, and print processing is performed as the straight print path for the GDI printer driver 203, within the GDI graphics driver 502. It is determined that selecting the XPS user interface driver 511 when printing from the Win32 application 201 is unsuitable. Hence, the relevant field is marked as "Unsuitable," because printing with the Win32 application 201 uses the GDI graphics engine 202, the GDI-XPS conversion 302 is performed, and print processing is performed as the cross print path for the XPS printer driver 213, within the XPS graphics driver 512.

Similarly, it is determined that selecting the XPS printer driver 213 when printing from the WinFX application 211 is suitable, because printing with the WinFX application 211 uses the XPI graphics engine 212, and print processing is performed as the straight print path for the XPS printer driver 213, within the XPS graphics driver 512. It is determined that selecting the GDI user interface driver 501 when printing from the WinFX application 211 is unsuitable, because printing with the WinFX application 211 uses the WPF graphics engine 212, the XPS-GDI conversion 312 is performed, and print processing is performed as the cross print path for the GDI printer driver 203, within the GDI graphics driver 502. Consequently, a value is registered with the relevant item that corresponds to the decision.

FIG. 9 depicts an example of a dialogue box 901 that is displayed by the dialogue display unit 705 within the user interface driver. If the selected printer driver is unsuited for the application when user print setting is completed, the suitable printer driver is recommended. Also displayed is the fact that the print setting that is performed with the unsuitable printer driver's user interface driver is maintained when the suitable printer driver is selected. In an embodiment, if the suitable printer driver is not present, having been uninstalled in some manner, the dialog box 901 will not be displayed. In an embodiment, the suitable printer driver is the printer driver that forms the straight print path.

Figure 10:
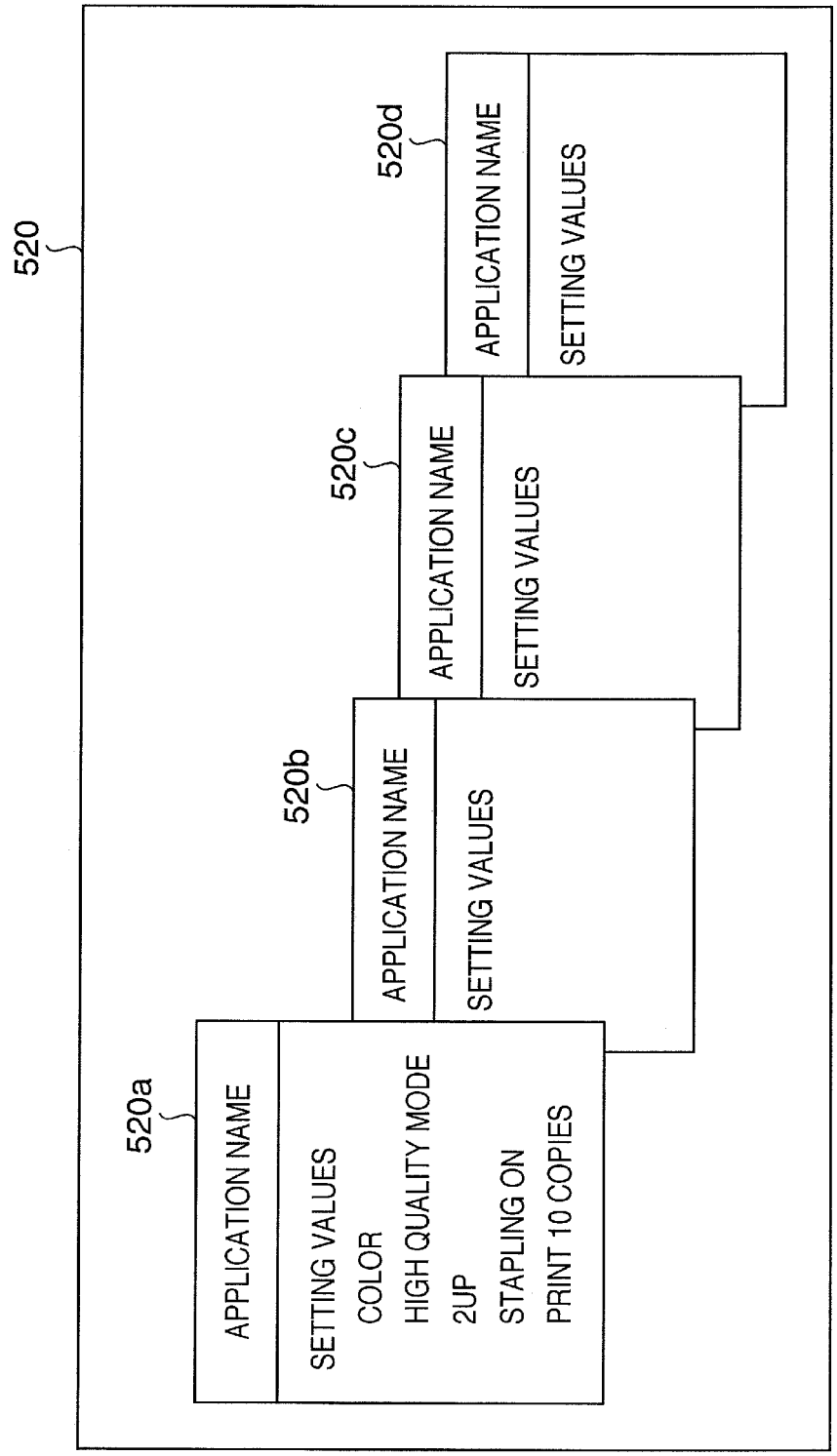
FIG. 10 depicts an example of setting information that is accessed in a user interface memory unit and a user interface configuration obtainment unit within the user interface driver according to an embodiment.

FIG. 10 depicts an example of the setting information that is accessed in the setting memory unit 706 and the setting obtainment unit 707 within the user interface driver. In FIG. 10, a plurality of setting information groupings 520a through 520d that are mutually linked with the application name, the printer driver identifier, and the setting value, i.e., the print setting information, are contained within the setting information. If the printer driver is determined to be unsuitable, the name of the application that requests the print, the printer driver identifier, and the print setting information at the time of request are saved by the user driver interface configuration memory unit 706. If the printer driver is determined to be the suitable printer driver that forms the straight print path, the print setting information that is an opposite is searched by the setting obtainment unit from the setting information 520, based on the application name. By reflecting the matching print setting information in the setting unit 702, time and trouble is avoided in the print setting when the user switches the driver. After utilizing the print setting information in the setting unit 702, using the setting information 520 to delete the saved application name, the printer driver identifier, and the print setting information allows avoiding confusion when performing a later print setting from the same application. Conversely, if fixed print setting information is used on a per application basis, it would be permissible not to delete the print setting information even after utilizing the print setting information in the setting unit 702. The printer driver type or the printer driver identifier that signifies the corresponding printer may be maintained within each respective application name and setting value grouping, and it would also be permissible to link by dividing a folder hierarchy on a per printer driver type basis, and maintain within each respective application name and setting value grouping.

Figure 11:
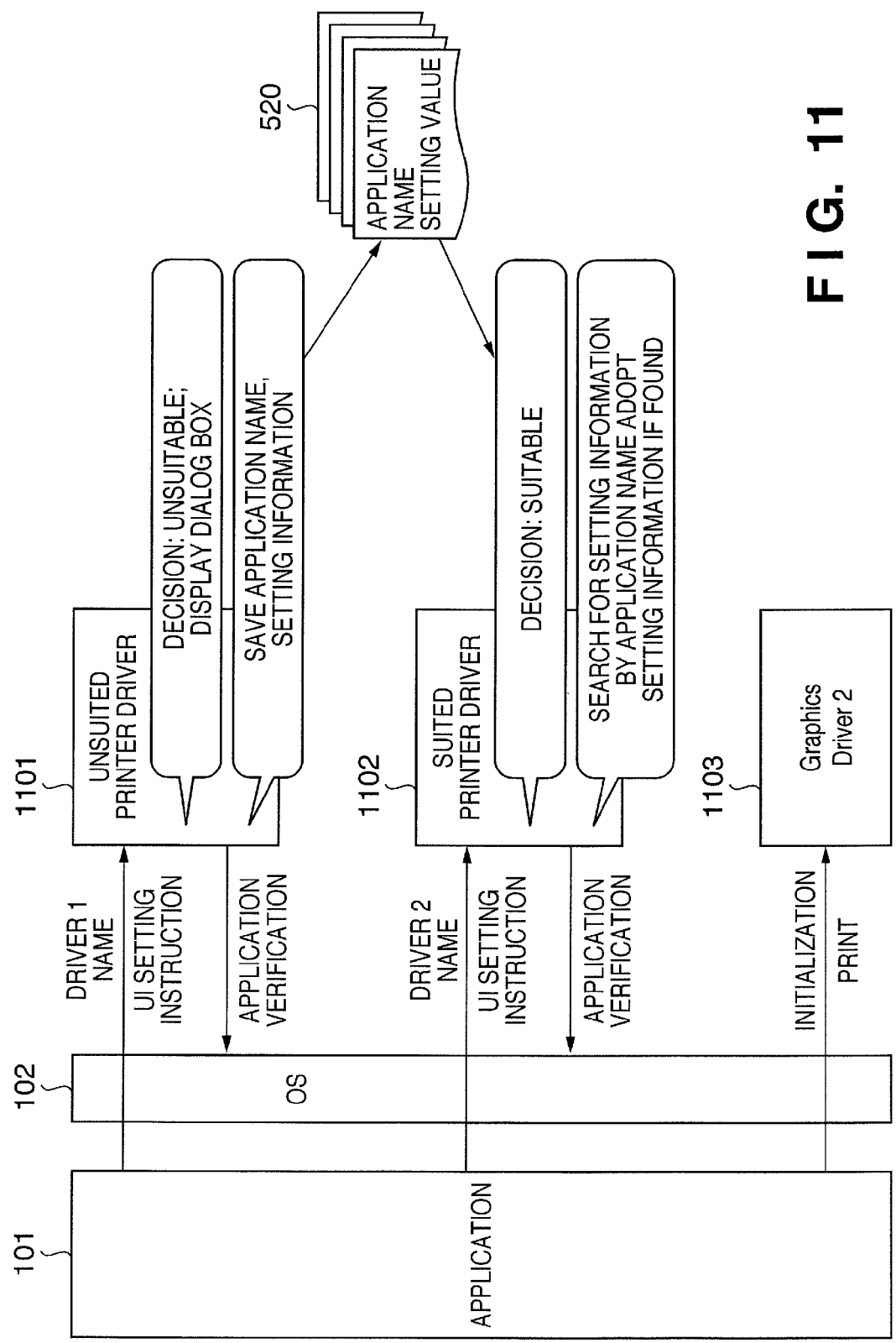
FIG. 11 depicts an overall path of a driver switch and a continuity of setting when an inappropriate user interface driver is selected according to an embodiment.

FIG. 11 is an overall flow of a driver switch and a continuity of setting when the inappropriate printer driver is selected as the printer driver to use, according to an embodiment. When printing the image or the text from the application 101 via the print apparatus, the user selects whether to execute the print operation after performing the print configuration, or to execute the print operation as is, without performing the print configuration.

According to the embodiment, when performing the graphics data output directly from the application 101 to the graphics driver, without launching the user interface driver, it is not possible for the user interface driver to perform the determination of the suitability or the unsuitability of the application and the printer driver, or to use the dialog box to notify the user of the recommended suitable printer driver. If the direct output of the graphics data from the application 101 to the graphics driver is performed after using the dialog box to notify the user of the recommended suitable printer driver, without launching the user interface driver, however, it is possible to draw on the saved print setting information to generate the print data.

In FIG. 11, when the user prints from the application 101, upon giving an instruction to the application to perform the printer driver print setting, the user interface driver is called by the application 101 based on the identifier of the selected printer driver. The setting instruction is simultaneously given to the user interface driver, which obtains the application information, i.e., the name and type, and a determination is made regarding the compatibility, i.e., the conformity or the suitability, of the application and the selected printer driver, as per the configuration in FIG. 7. If the selected printer driver is an unsuitable printer driver 1101, then, in response to the OK button being pressed, the print setting information that the user has set is linked to the application name and the identifier of the unsuited printer driver, which is the identifier of the selected printer driver in the present example, and saved, and a dialog box such as that depicted in FIG. 9 is displayed when the user interface driver terminates. Upon receiving the dialog box display when the user interface driver is launched while the unsuited printer driver is selected, the user selects a new printer driver for the application, in accordance with the dialog box display. If the instruction to perform the print setting is re-issued to the application thereafter, the suited user interface driver is called by the application 101 based on the name of the newly selected printer driver, and the setting instruction is given to the user interface driver.

The user interface driver that is called is the user interface driver of a suited printer driver 1102, and the setting screen is displayed and saved based on the print setting instruction that was saved in the unsuited printer driver user interface driver 1101. Consequently, it is unnecessary for the user to re-input the information that the user already configured when the unsuited printer driver was selected. A suited graphics driver 1103 is called by simply having the user instruct the application in print processing. It is thus possible to avoid the cross path associated with the data format conversion of the print path 352 or the print path 353 in FIG. 2. Hence, it is possible to avoid the print path wherein exists an issue pertaining to mishandling of a graphic, print speed, or feature set, and perform print processing on the straight path, for example, the print path 351, i.e., the GDI print path, or the print path 354, i.e., the XPS print path.

Figure 12:
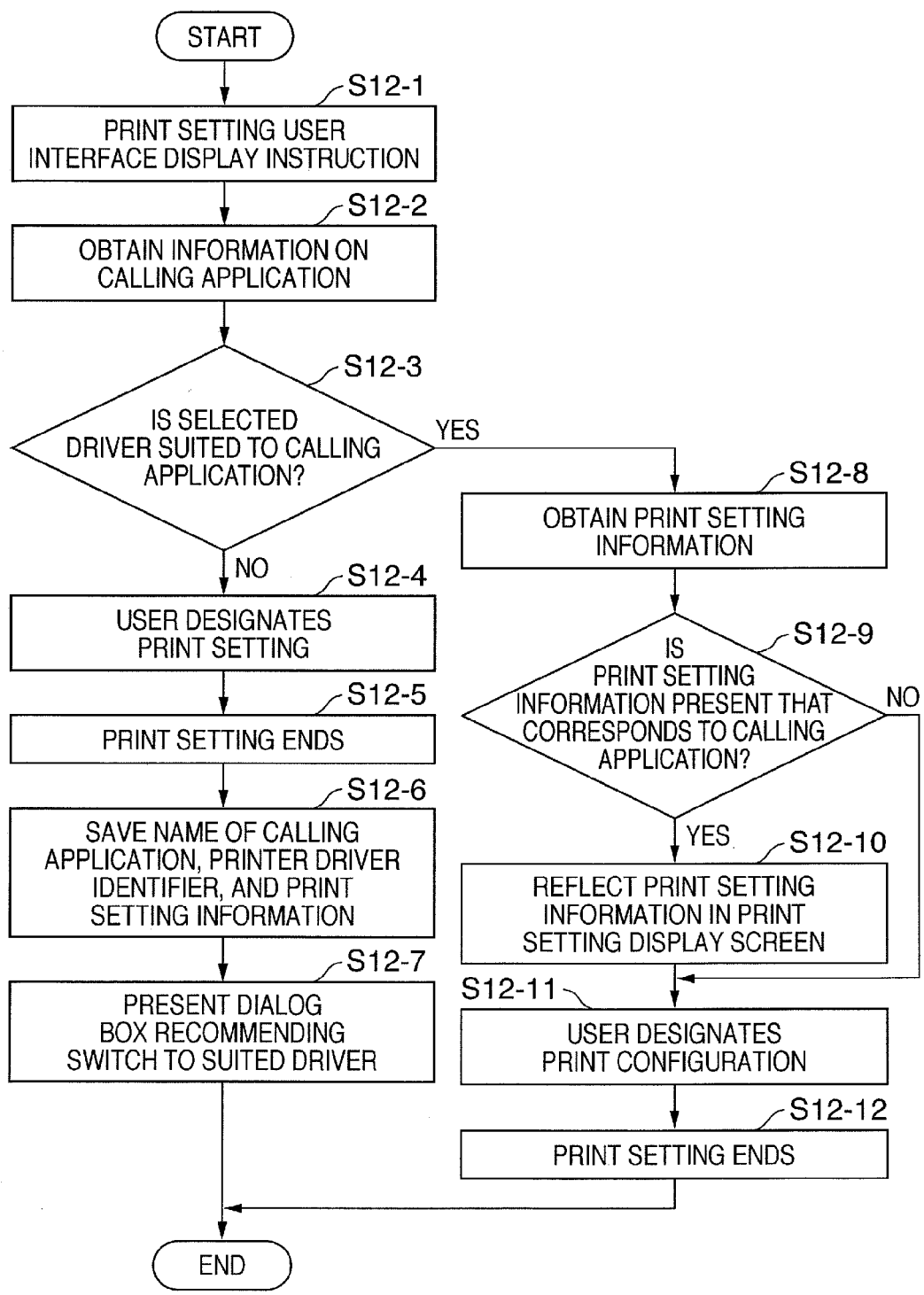
FIG. 12 is a flowchart that depicts a user interface driver path when a print setting user interface display instruction is passed to the user interface driver according to an embodiment.

FIG. 12 is a flowchart that depicts a user interface driver processing flow when the print setting user interface display instruction is passed to the user interface driver according to the embodiment.

When the user prints from the application 101, instructing the printer driver for the print setting causes the application to issue the print setting user interface display instruction to the specified printer driver's user interface driver. Consequently, the printer driver's user interface driver receives the display instruction, as per step S12-1.

Upon receipt of the print setting user interface display instruction, the user interface driver uses the aforementioned API to obtain information containing the name of the application, or the name of the executable file, that calls the API. The user interface driver also obtains the type information, based on the name, as to whether the called application is a Win32 application or a WinFX application, as per step S12-2.

The user interface driver determines whether or not the printer driver that contains the user interface driver is suited or not, in accordance with the obtained application type and the identifier of the selected printer driver, in particular the type that is specified by the identifier, per step S12-3. It is determined to be suited if the application and the printer driver form the straight print path, as depicted in the relational table in FIG. 8.

Following is a description of the process when the printer driver is determined to be unsuited (NO in step S12-3). The user interface driver displays the print setting user interface, following the display instruction from the application, and receives the print setting instruction from the user, per step S12-4. When an input signifying that the user configuration change is complete, by pressing the OK button, as per step S12-5, the user interface driver links the name of the original called application, or the executable file name, the identifier of the unsuited printer driver, and the inputted print setting information, and saves the linked information in the prepared setting information save area as the setting information 520, per step S12-6. Thus, the user interface driver performs the display of the change recommendation dialog box 901 that recommends the suited driver from FIG. 9, per step S12-7, and the process when it is determined that the printer driver is unsuited in step S12-3 terminates.

The user may then select a new printer driver and test printing, following a display in step S12-7. If the application subsequently issues a print request, and the graphics data output is performed, the graphics data format conversion is performed as the cross print path, the print data is generated using the graphics driver, and the print data is transmitted to the printer.

If, on the other hand, the printer driver is determined to be suited to the called original application (YES in step S12-3), the user interface driver reads the saved setting information that is saved in the setting information save area, per step S12-8. The user interface driver searches the setting information and determines whether or not the name of the called original application, or the executable file name, is saved. If it is saved, a determination is made that the print setting information that corresponds to the name of the called original application, or the executable file name, is present, per step S12-9. The search uses the information that signifies the printer driver identifier to find the print setting information that was saved when the unsuited printer driver was called.

If the print setting information that corresponds to the name of the called original application is present, the print setting information is saved as the print setting information of a print job to be performed, and reflected in the designated print setting user interface display screen, and the group of the print setting information, the printer driver identifier, and the application name, that is saved in the print setting information save area is deleted, per step S12-10. The print setting instruction is subsequently received from the user, per step S12-11.

When the setting value is changed via the print setting user interface display screen and the OK button is pressed, the input setting value is saved in the registry.

When the notice is received from the user that the setting change is completed, per step S12-12, the process when it is determined that the printer driver is suited in step S12-3 terminates. Subsequently, the data is passed from the application to the graphics engine, and the graphics data is then passed from the graphics engine to the printer driver. As the selected printer driver has been determined to be suited, no data format conversion is performed. The printer driver converts the graphics data into data described in PDL and transmits the data to the printer, following the print setting information that is saved in the registry in step S12-11. According to the embodiment, when generating the print data, the setting value that is saved in the registry is used, with the setting value that is configured in the unsuited user interface driver being saved in the shared print setting information save area, and made readable by the suited user interface driver.

When the print setting information that is saved in the shared print setting information save area is reflected in the print setting information of the suited printer driver, it is possible to perform one instance of continuity of the print setting information by deleting the read print setting information. When subsequently reprinting from the same application, the lack of the print setting information that corresponds to the setting information storage area means that either the default setting value or the setting value that is registered in the registry is reflected in the print setting information. Consequently, the subsequent print setting suffers no negative effect.

A configuration that satisfies the embodiment may be a configuration wherein the XPS printer driver and the GDI printer driver coexist on a single print apparatus, or where the XPS printer driver and the GDI printer driver exist as the component that converts the regular graphics data into the printer data.

Second Embodiment

When the printer driver is switched in FIG. 11, the user interface setting instruction is not passed by the suited user interface driver 1102, and the print processing commences directly in the graphics driver 1103, the information on the application that calls the graphics driver 1103, and not the user interface driver, is obtained, and the print processing performed based on the application name. In such circumstance, the process of steps S12-8 and later in FIG. 12 are executed by the graphics driver. After the user interface driver has executed the process of steps S12-8 and later in FIG. 12, deleting the read print setting information allows preventing overlapping redundant execution of step S12-10.

It is thus possible to reuse the print setting that is inputted when the unsuited printer driver is selected, after the selection is switched to the suited printer driver, even if the user interface driver is not called.

Third Embodiment

According to the embodiment, when the unsuited printer driver is selected, the printer driver identifier is linked to the print setting information and the application name, and saved. If the printer driver that is installed on the computer corresponds to only one printer, however, there is no need to save the printer driver identifier, because the printer driver type is restricted to two types, according to the embodiment. If the selected printer driver is unsuited, it is possible to specify that the print setting information that corresponds to the application name is the print setting information that was saved for the application when the unsuited printer driver was selected, if the print setting information that corresponds to the application name was saved. Consequently, there is no need to save the printer driver identifier.

The present invention may be applicable whether to a system that is constituted of a plurality of devices, which may include, but are not limited to, for example, the host computer, an interface device, a reader, and the printer, or an apparatus that is constituted of a single device, which may include, but is not limited to, for example, a photocopier or a fax machine. The objectives of the present invention are also achieved by supplying a recording medium upon which is recorded a program code that fulfills the feature set of the embodiment to the system or the device, and by a computer in the system or the device reading and executing the program code that is stored on the recording medium. In such circumstance, the program code itself that is read out from the recording medium fulfills the feature set of the embodiment, and the program code itself and the recording medium that stores the program code will constitute the present invention.

The present invention also includes a circumstance wherein an actual process, in whole or in part, is performed by the operating system or other code that runs on the computer, in accordance with the instruction of the program code, and the process fulfills the feature set of the embodiment. An instance wherein the program code that is read out from the recording medium is written to a memory unit that is built into an expansion card that is fitted into the computer or an expansion unit that is connected to the computer also is applicable to the present invention. In such circumstance, the actual process, in whole or in part, is performed by a CPU or other unit that is built into the expansion card or the expansion unit, in accordance with the instruction of the program code, and the process fulfills the feature set of the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus on which a first type printer driver and a second type printer driver, different from the first type printer driver, can run, the information processing apparatus comprising:
    a determination unit configured to determine whether a combination of the second type printer driver called for printing and an application calling the second type printer driver is suited, wherein the combination is determined to be suited when conversion of graphics data output from the application is not required; and
    a display control unit that controls display processing such that a name of the first type printer driver is displayed as a printer driver to create print data based on the graphics data and, in response to the determination unit determining that the combination is not suited, a name of the second type printer driver is not displayed,
    wherein a print apparatus for the first type printer driver is same as the print apparatus for the second type printer drivers.

2. The information processing apparatus according to claim 1, wherein the first type printer driver is an XPS printer driver and the second type printer driver is a Graphics Device Interface (GDI) printer driver.

3. A method of controlling, which is performed by an information processing apparatus on which a first type printer driver and a second type printer driver, different from the first type printer driver, can run, the method comprising:

determining whether a combination of the second type printer driver called for printing and an application calling the second type printer driver is suited, wherein the combination is determined to be suited when conversion of graphics data output from the application is not required; and controlling display processing such that a name of the first type printer driver is displayed as a printer driver to create print data based on the graphics data and, in response to determining that the combination is not suited, a name of the second type printer driver is not displayed, wherein a print apparatus for the first type printer driver is same as the print apparatus for the second type printer drivers.

4. The method according to claim 3, wherein the first type printer driver is an XPS printer driver and the second type printer driver is a Graphics Device Interface (GDI) printer driver.

5. A non-transitory computer readable medium storing a program that causes an information processing apparatus to perform the method according to claim 3.

6. The non-transitory computer readable medium according to claim 5, wherein the first type printer driver is an XPS printer driver and the second type printer driver is a Graphics Device Interface (GDI) printer driver.

7. The information processing apparatus according to claim 1, wherein, in response to the second type printer driver being called by the application, the display control unit displays the name of the first printer driver after print setting information is set via a setting screen provided by the second type printer driver.

8. The information processing apparatus according to claim 1, further comprising a conversion unit that converts graphics data in an XPS format to graphics data in another format.

9. The information processing apparatus according to claim 8, wherein the another format is an Enhanced Metafile (EMF) format.

10. The method according to claim 3, wherein, in response to the second type printer driver being called by the application, controlling includes displaying the name of the first printer driver after print setting information is set via a setting screen provided by the second type printer driver.

11. The method according to claim 3, further comprising converting graphics data in an XPS format to graphics data in another format.

12. The method according to claim 11, wherein the another format is an Enhanced Metafile (EMF) format.

13. The non-transitory computer readable medium according to claim 5, wherein, in response to the second type printer driver being called by the application, controlling includes displaying the name of the first printer driver after print setting information is set via a setting screen provided by the second type printer driver.

14. The non-transitory computer readable medium according to claim 5, further comprising converting graphics data in an XPS format to graphics data in another format.

15. The non-transitory computer readable medium according to claim 14, wherein the another format is an Enhanced Metafile (EMF) format.

* * * * *